June 14, 1966 — F. S. SILLARS — 3,255,945
SIDE SEAM SOLDERING MACHINES
Filed Feb. 3, 1964 — 4 Sheets-Sheet 1

Inventor
Frederick S. Sillars
By his Attorney
Richard B. Megley

June 14, 1966  F. S. SILLARS  3,255,945
SIDE SEAM SOLDERING MACHINES
Filed Feb. 3, 1964  4 Sheets-Sheet 3
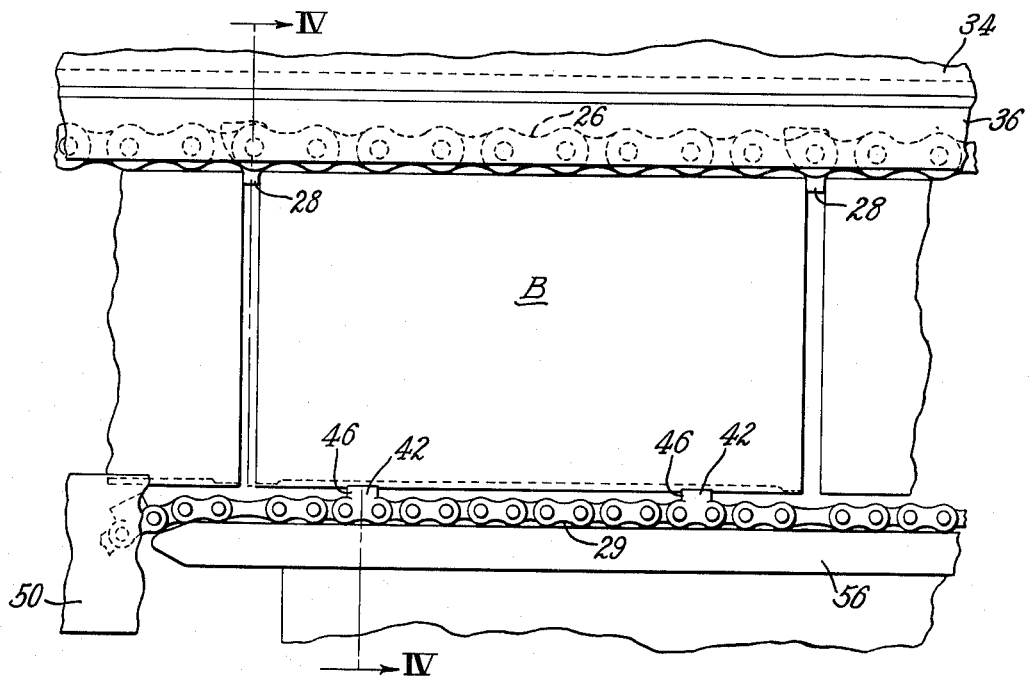
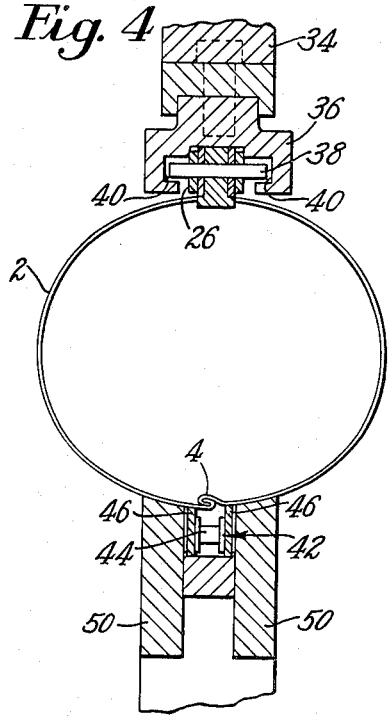
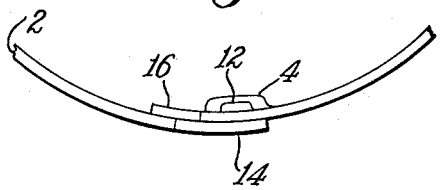

June 14, 1966 F. S. SILLARS 3,255,945
SIDE SEAM SOLDERING MACHINES

Filed Feb. 3, 1964 4 Sheets-Sheet 4

United States Patent Office 3,255,945
Patented June 14, 1966

3,255,945
SIDE SEAM SOLDERING MACHINES
Frederick S. Sillars, Beverly, Mass., assignor to United Shoe Machinery Corporation, Flemington, N.J., a corporation of New Jersey
Filed Feb. 3, 1964, Ser. No. 342,106
12 Claims. (Cl. 228—47)

This invention relates to can making and, more specifically, to a modified side seam soldering machine for applying solder to partially fabricated containers of the type illustrated and described in United States Letters Patent 3,056,368, issued October 2 1962, in the name of the present inventor.

The bodies of cans commonly employed to package most foods are made from a rectangular sheet of tin-coated steel which is formed into an open ended cylinder by interlocking narrow marginal portions of opposite parallel edges of the rectangle to produce a juncture called the side seam. The interlocking side seam extends lengthwise of the cylindrical body to within approximately one-quarter of an inch of each of the open ends where the marginal portions of the edges are secured by a lap seam. In cross section, measured radially of the can, the interlocked side seam includes four layers of metal. However, in cross section the lap joints, hereinafter referred to as the "laps," comprise two layers of metal in the form of overlapping tabs. The purpose of the laps is to facilitate the attachment of the top and bottom of the can body.

The top and the bottom are attached by flanging outwardly an annular margin adjacent to the open ends of the body and then curling the flanged margin into an interlocking formation with the adjacent edge portion of the top and bottom form therewith what is known as the "double seam." If the interlocked side seam extended to the ends of the can, four folds of metal would have to be flanked and doubled over to be included in the double seam with the top and bottom. However, by terminating the interlocked side seam short of the ends and providing the thinner lap joints only two layers of body material need be flanged outwardly instead of four.

The above-referenced United States patent is directed to a method of and apparatus for soldering cans having overlapping layers or tabs which normally tend to gap. The gap is located only in the portions of the juncture which have been referred to as the laps. This gap results from the method of manufacturing the body of the cans. The commonly employed wing-type body-maker produces a can body having a side seam as described hereinabove with the outer layer of the laps being displaced from the inner layer, as illustrated in FIG. 7 of the referenced patent. The laps must be closed in order to provide a merchantable can, to facilitate uniform solder application and prevent excessive deposits of solder, and to maintain the thickness of the lap area at a minimum. The gaps are closed or the outer layer compressed in the apparatus of the referenced patent by an endless chain having compressing lugs engageable with the trailing overlapping outer layer of one can body simultaneously with the leading overlapping outer layer of the succeeding body thereby to compress the laps. This operation is preformed subsequent to the aplication of solder and during the solidification process.

The compressor lugs of the referenced patent also serve as a base or support for the can body during its traverse of the solidifying section of the apparatus. A can body is conveyed past the solidifying instrumentalities, such as a spray mist, by the co-operative action of an endless chain having feed dogs engageable with the trailing end of the cylindrical can bodies and the endless chain on which the compressor lugs are located. The relative position of the compressor chain is such that a can located thereon is compressed between the compressor chain and the feed chain thereby to ensure continuity of can body location. Pivotal movement of the can body is effectively prevented as the can body is mounted on the compressor lugs which bear against opposite ends of the can body along the side seam.

The present invention is directed to a modification of the machine disclosed in the above-referenced patent for the side seam soldering of can bodies which do not have a gap in the laps when presented to the machine, i.e. can bodies manufactured by roll-form body-makers. Can bodies of this type cannot be soldered on the apparatus delineated in the referenced patent because the compressor lugs cause the inner layer of the lap to be displaced thereby producing an opening or gap on the inside of the can at the laps. That is, the pressure exerted on the closed laps by the compressor lugs is transmitted to the inner layer of the lap and urges the inner layer inwardly away from the outer layer. The technical explanation for this result is that the inner layer is displaced an amount sufficient to effect an equating force equal and opposite to that applied by the lugs in the compression of the can body. When the can body is initially gapped the forces are substantially equated in closure.

The problem of gapping on the inside of the can body cannot be solved by positioning the compressor lugs of the referenced patent out of phase with the laps of can bodies being fabricated, i.e. adjusting the compressor chain so that the compressor lugs contact the can body along the side seam at a point disposed from the laps. If the compressor lugs contact the can body along the interlocked portion of the side seam, the solder applied thereto is chilled or solidified before it has completely penetrated the interlocked seam. The result is a defective seam. The solder must be allowed to work into the elongated, serpentine crevices of the interlock and displace the flux entrapped therein. When a compressor lug contacts the interlocked seam, it chills or solidifies the solder prematurely thereby preventing complete or adequate penetration into the sinuous crevice of the seam. The problem does not exist at the laps because the laps comprise only two abutting layers having a relatively short reentrant gap which do not present the considerably elongated, winding crevice encountered along the interlocked portion. Further, since the lap is not enclosed, the flux is not entrapped and, therefore, does not impede solder application.

The removal of the compressor lugs from the compressor chain also does not provide a solution to the problem. As stated above, the lugs assist in maintaining the can body in alined position. The can body must be contacted at two displaced locations in order to ensure alinement integrity. If the can were allowed to ride on the chain links, random movement would be possible. Stationary base members or support means are also not adequate as they would result in the marking or scraping of can bodies that are moved over them. The base or support members must move at the same rate of speed as the feed chain in order to prevent damage to the can bodies.

The subject invention is also directed to the modification of the machine of the referenced patent to facilitate the soldering of the side seams of cans which do not have laps. Cans of this type are called "snap-end" cans and are used for a limited number of products. The discussion hereinabove relating to the support of a can body along the side seam is also germane to cans of this type. The "snap-end" can seam cannot be contacted along the side seam without adversely affecting the flow of solder into the crevice of the interlocked seam.

Yet the can must be supported at two displaced points during its progression through the solidifying stage in order to maintain proper alinement.

Accordingly, it is an object of this invention to provide apparatus for soldering an article having a side seam.

It is a further and more specific object of this invention to provide apparatus for applying solder to an article having a side seam and for conveying said article on said apparatus without affecting the distribution and solidification of the solder by the conveying means.

It is a still further object of this invention to provide apparatus for applying solder to an article having a side seam and associated means for conveying the article on said apparatus without altering the character of the side seam.

To these ends there is provided in a machine for soldering an article comprising feed means for moving the article along a predetermined path of travel, which means are illustrated hereinafter as an endless feed chain having feed dogs engageable with the trailing end of the article, means for applying solder to the seams of the article, a feature embodied in support means cooperative with the feed means to feed the article and maintain alinement thereof without distorting or affecting the character or configuration of the seam, the support means comprising an endless chain having a plurality of support members linked therein comprising upstanding extension members which contact the article on opposite sides of the seam at a plurality of locations.

The above and other features of the invention including various novel details of construction and combinations of parts will now be more particularly described with reference to the accompanying drawings and pointed out in the claims. It will be understood that the machine embodying the invention is shown by way of illustration and not as a limitation of the invention. The principles and features of this invention may be utilized in varied and numerous embodiments and applications without departing from the scope of the invention.

In the drawings,

FIG. 3 is a detail view in side elevation on enlarged scale of a portion of the machine shown in FIG. 1 including the feed means;

FIG. 4 is a sectional view taken on the line IV—IV of FIG. 3;

FIG. 5 is an end view of a portion of a can body of the type manufactured on roll-top body makers;

Figure 7:
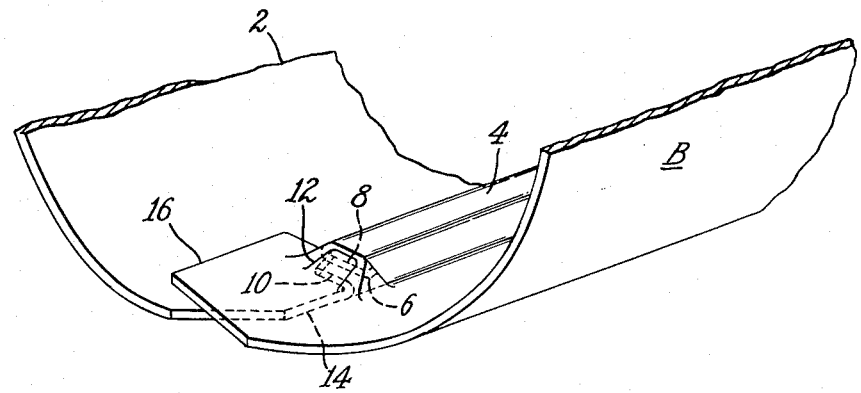
FIG. 7 is a perspective view partly broken away of a can of the type illustrated in FIG. 5 showing the interlocking and overlapping portions of the side seam.

The body portion B of a can having laps is best seen in FIG. 7 and includes a cylindrical wall 2 with an interlocking side seam 4 comprising the usual inside hook 6, outside hook 8 and end lock projection 10 located beneath the end lock step 12. Between the side seam and the ends of the can (only one of which can be seen in FIG. 7) are located the outside and inside layers 14 and 16 of the laps, respectively. The inside layer 16 is a tab-like projection formed from the same edge of the original body material as the inside hook 6. The outside hook 8 is formed intermediate the ends of a can between the outside layer 14 located on opposite ends of the can along the edge common thereto. The inside hook 6 and outside hook 8 are interlocked and "bumped" into close relationship to form the side seam 4.

Can bodies of the "snap-end" type have an interlocked seam comprising an inside hook and outside hook extending the length of the juncture. The invention to be hereinafter described will be discussed with respect to can bodies having a side seam of the type delineated in the preceding paragraph, i.e., one having laps. It being clearly understood that the disclosed apparatus is equally advantageous for use in soldering bodies for "snap-end" cans.

Figure 1:
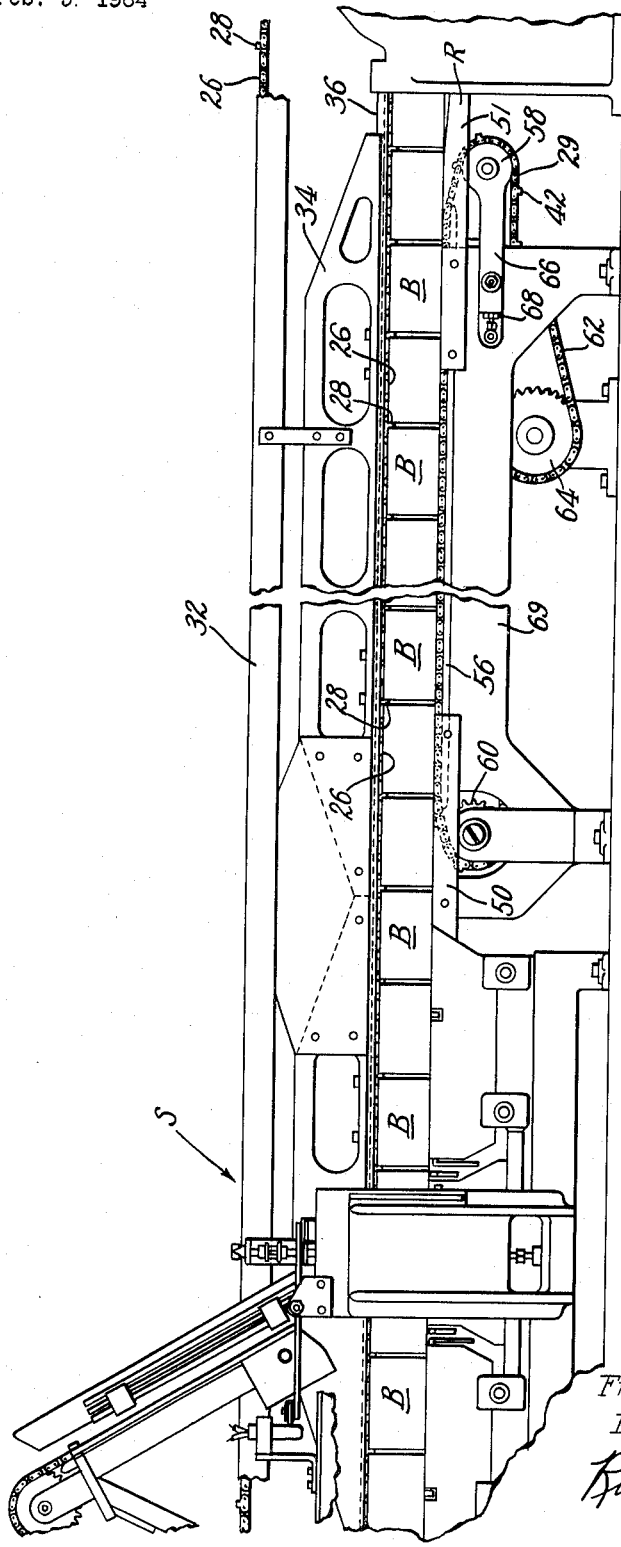
FIG. 1 is a side elevation of a machine embodying the invention.

As illustrated in FIG. 1, can bodies introduced to the machine are conveyed from left to right in a timed and spaced order by an endless conveyor chain 26 having feed dogs 28 located at intervals thereon, each dog being engageable with the trailing end of one can body. The bodies are conveyed past a soldering stations S preferably of the type illustrated and described in United States Letters Patent No. 3,000,338, issued September 19, 1961, in the name of the present inventor. The soldering station, per se, forms no part of the present invention.

After the solder has been applied at the soldering station the can body must be removed from the soldering station without contacting the seam to ensure penetration of the solder into the sinuous crevice thereof. Furthermore, the can body must remain on the apparatus a sufficient interval to permit uniform solder solidification. The side seam cannot be contacted by an unregulated, localized, outside chilling source during this entire period. Controlled artificial means such as a water spray may be provided to effectuate a desired rate of solidification. Although it is considered preferable to provide such artificial solidification means, provision thereof, per se, forms no part of this invention.

Figure 2:
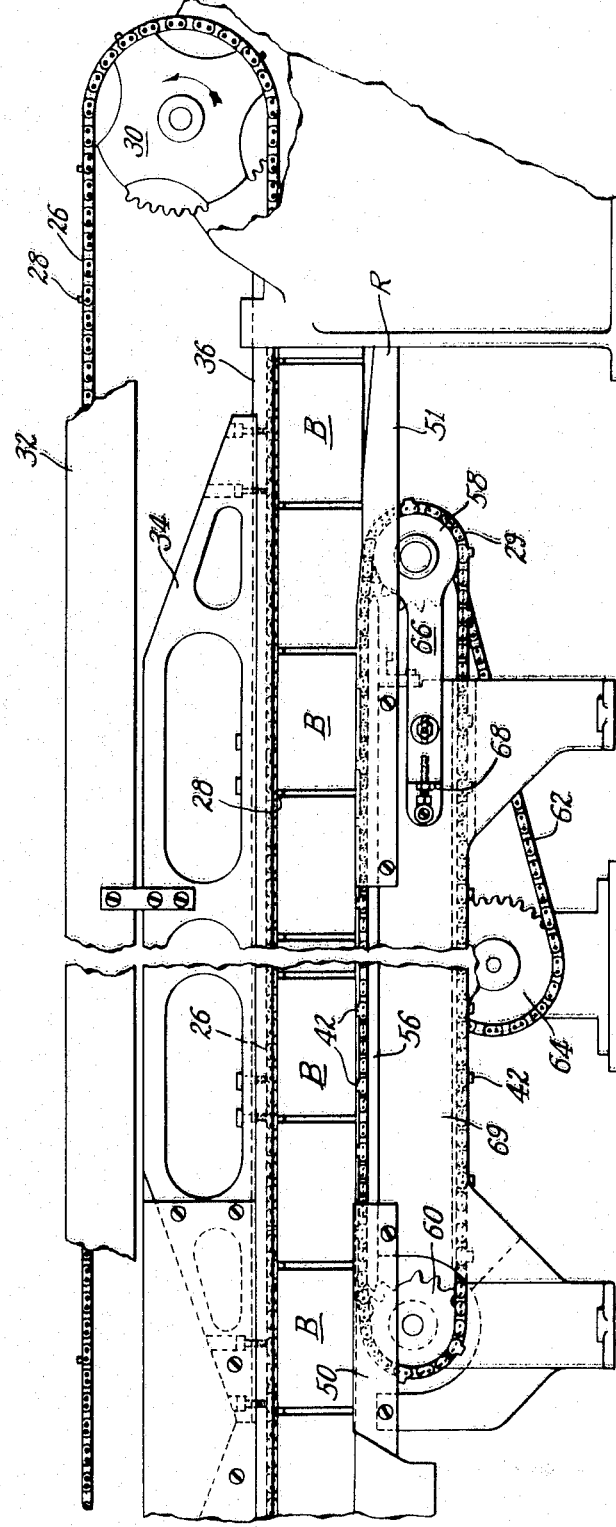
FIG. 2 is a side elevation on enlarged scale of a portion of the machine shown in FIG. 1.

As illustrated in FIGS. 1 and 2, the conveyor chain 26 and a support chain 29 cooperate to remove can bodies B from the solder station S and to convey the can bodies to a removal station R. The can bodies remain in position between the conveyor chain 26 and support chain 29 for a predetermined period sufficient to allow uniform, controlled solidification.

The conveyor chain 26 passes around a sprocket wheel 30 which is driven in a counterclockwise direction. The upper portion of the chain is supported in a guide 32 which is mounted on a machine frame member 34 while the lower portion is supported by a guide 36 which depends from the frame member. Referring to FIG. 4, it will be seen that the conveyor chain is supported in the guide 36 by studs 38 which project from the chain links and slide in guideways 40. It will be noted that the guideway openings, measured vertically, are larger than the diameter of the studs 38. The chain 26 will normally rest by its own weight on a can body but will yield upwardly a slight amount by pressure applied by the can as will become apparent from the description which follows.

Figure 6:
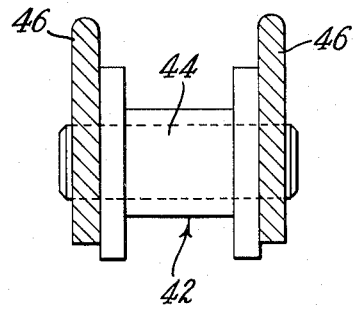
FIG. 6 is a detail view in front elevation on enlarged scale of a support member removed from the support chains.

The support chain 29 is an endless chain having a plurality of support members 42 linked therein. The support members 42 comprise chain links 44 having upstanding members 46, 46 extending outwardly therefrom on opposite sides thereof, as best illustrated in FIGS. 4 and 6. The members 46, 46 on a given link 42 are spatially positioned to engage a can body on opposite sides of the side seam during a portion of the support chain's rotative cycle. The spatial relationship is established by the manner in which the members 46, 46 are mounted on the link 42. As viewed in FIGS. 3 and 4, the members 46, 46 will be seen to extend upwardly from the links 44 a distance sufficient to support a can body after it no longer is supported by the spaced guide members 50 which constitute the egress support means associated with the solder applicator. The members 46, 46 of a given link 42 initially contact a can body at a point intermediate the ends of the guide members 50, 50, as best shown in FIGS. 1 and 2. Upon egress from the guide members 50, 50, a can body is fixedly supported on the upstanding members 46, 46 of two support links 42 which cooperate with the conveyor chain 26 to progress the can bodies through the solidification stage to the removal station R comprising guide members 51.

The center-to-center spacing of the support links 42 on the support chain 29 is such that the members 46, 46 of successive, cooperative links engage intermediate portions of a can body close to the laps. Thus, as a result of the spacial relationship of the links 42 and feed dogs 28, can bodies are cooperatively fed thereby, the links 42 provide a support to ensure can body alinement, the laps are not contacted and the danger of gapping is eliminated. Further, since the links 42 contact the can body laterally of the sides of the side seam, the flow of solder thereto is not adversely affected.

The support chain 29 is supported by and moves in a guideway 56 (FIGS. 1, 2 and 3) and passes around sprocket wheels 58, 60. The wheel 58 is connected by an appropriate drive chain 62 to a gear reducer 64 which is connected by means not shown, to the sprocket 30 which rotates the conveyor chain 26. Tension in the chain 29 is controlled in a conventional manner by varying the position of a bracket 66 which mounts the wheel 58. The bracket 66 is adjustable by rotating a screw 68 threaded in a main supporting frame member 69 for the support chain 29.

In operation, the can bodies B are conveyed by the feed dogs 28 on the conveyor chain 26 in spaced end-to-end relationship with their seams in alinement at the bottom of the bodies. The length of the dogs, measured lengthwise of the chain 26, determines the space between the trailing edge of one body and the leading edge of the next. After passing from the soldering means the can bodies move onto the guide members 50 and are squeezed vertically assuming elliptical shape under the pressure applied by the chain 26. While being supported on the guide members 50, the can bodies are engaged by the support members 46, 46 or the links 42 which maintain the elliptical configuration thereof upon removal from the guide members 50. Ergo, the can bodies are squeezed between the conveyor chain 26 and the support links 42 on the support chain 29 thereby to ensure alinement integrity of the can bodies during the solder solidification period. Since the chains 26 and 29 are moving at the same linear speed and since the support dogs 28 and links 42 are arranged on these respective chains in a predetermined spacial relation when the chains are parallel, the desired relationship will be obtained as shown in FIG. 3. The can bodies are thus conveyed to the removal station for introduction to the next forming station.

Having thus described my invention, what I claim as new and desire to secure by Letters Patent of the United States is:

1. In a machine for soldering an article having a seam including an interlocking portion, said machine comprising feed means for moving the article along a predetermined path of travel and means for applying solder to the seam, the combination of means cooperative with the feed means to feed the article and to maintain alinement thereof without influencing the distribution and solidification of solder comprising drive means having a plurality of support members mounted thereon engageable with the article at displaced positions intermediate the ends of said article and laterally of the side seam.

2. In a machine for soldering an article having a seam including an interlocking portion, said machine comprising feed means for moving the article along a predetermined path of travel having a plurality of feed members mounted thereon and means for applying solder to the seam, the combination of means cooperative with the feed means to feed the article and to maintain alinement thereof without influencing the distribution and solidification of solder comprising drive means having a plurality of support members mounted thereon engageable with the article intermediate the ends of said article and laterally of the side seam and movable in synchronism with said feed members whereby said feed members and support members are positioned to cooperatively engage and convey an article introduced thereto.

3. In a machine for soldering an article having a seam including an interlocking portion, said machine comprising feed means for moving the article along a predetermined path of travel and means for applying solder to the seam, the combination of means cooperative with the feed means to feed the article and to mainain alinement thereof comprising drive means having a plurality of support members mounted thereon engageable with the article at displaced positions, said support members having a plurality of upstanding members extending outwardly therefrom engageable with the article laterally of the sides of the seam.

4. In a machine for soldering an article having a seam incuding an interlocking portion, said machine comprising feed means for moving the article along a predetermined path of travel and means for applying solder to the seam, the combination of means cooperative with the feed means to feed the article and to maintain alinement thereof without influencing the distribution and solidification of solder comprising an endless conveyor chain having a plurality of support members linked therein engageable with the article at displaced positions, each of said support members comprising means which contact the article laterally of the side of the seam.

5. In a machine for soldering an article having a seam including an interlocking portion, said machine comprising feed means for moving the article along a predetermined path of travel and means for applying solder to the seam, the combination of means cooperative with the feed means to feed the article and to maintain alinement thereof comprising an endless conveyor chain having a plurality of support members linked therein engageable with the article at displaced positions, said support members comprising a link member having extension members mounted on opposite sides thereof extending outwardly therefrom, said extension members being engageable with the article laterally of the sides of the seam thereby to fixedly support the article without influencing the distribution and solidification of the solder and the character of the seam.

6. In a machine for soldering an article having a seam including an interlocking portion, said machine comprising feed means for moving the article along a predetermined path of travel having a plurality of feed members mounted thereon and means for applying solder to the seam, the combination of means cooperative with the feed means to feed the article and to maintain alinement thereof comprising drive means having a plurality of support members mounted thereon engageable with the article at displaced positions and movable in a predetermined spacial relationship with said feed members to cooperate therewith to convey an article introduced thereto, said support members having a plurality of upstanding members extending outwardly therefrom engageable with the article laterally of the sides of the seam.

7. In a machine for soldering an article having a seam including an interlocking portion, said machine comprising feed means for moving the article along a predetermined path of travel having a plurality of feed members mounted thereon and means for applying solder to the seam, the combination of means cooperative with the feed means to feed the article and to maintain alinement thereof without influencing the distribution and solidification of solder comprising an endless conveyor chain having a plurality of support members linked therein engageable with the article at displaced positions and movable in a predetermined spacial relationship with said feed members to cooperate therewith to convey an article introduced thereto, each of said support members having means which contact the article laterally of the sides of the seam.

8. In a machine for soldering an article having a seam including an interlocking portion, said machine comprising feed means for moving the article along a predetermined path of travel having a plurality of feed members mounted thereon and means for applying solder to the seam, the combination of means cooperative with the feed means to feed the article and to maintain alinement thereof comprising an endless conveyor chain having a plurality of support members linked therein engageable with the article at displaced positions and movable in a predetermined spacial relationship with said feed members to cooperate therewith to convey an article introduced thereto, said support members comprising a link member having extension members mounted on opposite sides thereof extending outwardly therefrom, said extension members being engageable with the article laterally of the sides of the seam thereby to fixedly support the article without influencing distribution and solidification of the solder and the character of the seam.

9. In a machine for soldering can bodies having side seams including an interlocking portion, the combination of means for moving the bodies longitudinally of a soldering station along a predetermined path in spaced relationship including a conveyor chain having feed dogs uniformly spaced thereon, each dog being engageable with the trailing end of a can body diametrically opposite the seam, and means cooperative with said moving means including a second chain having a plurality of support members engageable with a can body intermediate the ends thereof and laterally of the side seam thereby to support the can bodies.

10. In a machine for soldering can bodies having side seams including an interlocking portion, the combination of means for moving the bodies longitudinally of a soldering station along a predetermined path in spaced relationship including a conveyor chain having feed dogs uniformly spaced thereon, each dog being engageable with the trailing end of a can body diametrically opposite the seam, and means cooperative with said moving means including a second chain having a plurality of support members engageable with a can body intermediate the ends thereof thereby to support the can bodies, said support members comprising bifurcated means engageable with the can body laterally of the seam.

11. In a machine for soldering can bodies having side seams including an interlocking portion, means for moving the bodies longitudinally of a soldering station including a conveyor chain having feed dogs uniformly spaced thereon engageable with the trailing end of a can body and means cooperative with said moving means for supporting the can bodies including a second chain having a plurality of spaced support members engageable with a can body diametrically opposite the line of engagement of the feed dogs, laterally of the side seam and spaced forwardly of said dogs in the direction of can body movement.

12. In a machine for soldering can bodies having side seams including an interlocking portion, means for moving the bodies longitudinally of a soldering station including a conveyor chain having feed dogs uniformly spaced thereon engageable with the trailing end of a can body and means cooperative with said moving means for supporting the can bodies including a second chain having a plurality of spaced support members engageable with a can body diametrically opposite the line of engagement of the feed dogs and spaced forwardly of said dogs in the direction of can body movement, said support members comprising bifurcated means engageable with the can body laterally of the seam.

References Cited by the Examiner
UNITED STATES PATENTS

| 2,996,040 | 8/1961 | Bofinger | 228—47 |
| 3,056,368 | 10/1962 | Sellars | 228—49 |

WHITMORE A. WILTZ, *Primary Examiner.*

M. L. FAIGUS, *Assistant Examiner.*